United States Patent

Bordenca

[15] 3,681,462
[45] Aug. 1, 1972

[54] DIALKYLAMINOALKYL ACETYLENIC ETHERS

[72] Inventor: Carl Bordenca, Ponte Vedra Beach, Fla.

[73] Assignee: SCM Corporation, Cleveland, Ohio

[22] Filed: July 31, 1969

[21] Appl. No.: 846,610

[52] U.S. Cl. ..............................260/584 C, 434/325
[51] Int. Cl. ........................C07c 91/24, C07c 93/10
[58] Field of Search ..................................260/584 C

[56] References Cited

UNITED STATES PATENTS

| | | | |
|---|---|---|---|
| 3,072,666 | 1/1963 | Watson | 260/584 C X |
| 2,997,447 | 8/1961 | Russell et al. | 252/351 |
| 3,446,843 | 5/1969 | Bordenca et al. | 260/563 |

OTHER PUBLICATIONS

Da Re, Chemical Abstracts, Vol. 50 (1956) page 9996g.
Zhurnal Obshchei Khimie, Vol. 27 (1957) pages 1518 and 1519.
Easton et al., Chemical Abstracts, Vol. 58 (1963) pages 12536h and 12538a.

Primary Examiner—Joseph Rebold
Assistant Examiner—Richard L. Raymond
Attorney—Harold M. Baum, Merton H. Douthitt, Howard G. Bruss and Russell L. Brewer

[57] ABSTRACT

Compounds of the formula:

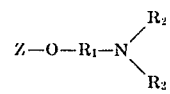

where Z is selected from the group consisting of alkynyl and hydroxy substituted alkynyl groups having from five to 10 carbon atoms, $R_1$ is lower alkylene containing from one to six carbon atoms in the alkylene group and $R_2$ and $R_3$ are like or dissimilar lower alkyl and stable salts thereof. Also described are compositions containing the compounds as well as processes for controlling arachnids.

The compounds, compositions, and processes are advantageous in that they provide effective means of controlling arachnids, such as mites, spiders, and ticks without harming human beings and animal wildlife.

6 Claims, No Drawings

DIALKYLAMINOALKYL ACETYLENIC ETHERS

The invention relates to novel compounds and compositions which are effective in killing arachnids (e.g., Acarinae) such as spiders, mites, ticks, and the like. The present invention further relates to processes for controlling arachnids. Conventional acaricides which are most widely used usually consist of chlorinated aryl compounds containing sulfur and chlorinated cycloaliphatic compounds or thiocarbamates. Many acaricides are disadvantageous in that they either do not decompose or they leave residues which are toxic to wildlife including fish and game animals, as well as to human beings.

A novel class of compounds has presently been found which overcomes the disadvantages of the more widely-used acaricides.

The invention provides a compound of the formula:

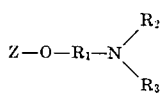

where Z is selected from the group consisting of alkynyl and hydroxy substituted alkynyl groups having from five to 10 carbon atoms, $R_1$ is lower alkylene and $R_2$ and $R_3$ are like or dissimilar lower alkyl. Such compounds are effective in controlling arachnids in concentrations as low as 0.1 percent based on the weight of the compositions in which they are employed. In the foregoing formula, $R_2$ and $R_3$ are like or dissimilar lower alkyl containing from one to six carbon atoms but are preferably like lower alkyl for economic reasons. Compounds in which $R_2$ and $R_3$ are ethyl have been found to be especially advantageous acaricides.

In the foregoing formula, $R_1$ is lower alkylene and can be methylene, ethylene, propylene, butylene, pentylene, or hexylene, but is preferably ethylene for economic reasons.

In the formula, Z is an alkynyl group or a hydroxy-substituted alkynyl group in which the carbon atom chain can be straight or branched. The alkynyl group can contain up to 50 carbon atoms but preferably contains between five and 30 carbon atoms. The acetylenic bond in the alkynyl group can be in any position where proper valence bonding is satisfied. Thus, the acetylenic bond can be in the 1 position (e.g., between the first and second carbon atom in the chain), or the acetylenic bond can be in the 2, 3, 4, or 5 positions.

Specific examples of compounds falling within the scope of the above formula which have been found to be particularly advantageous acaricides are those in which Z is hydroxy substituted and include: 6-hydroxy-3, 6-dimethyl-4-octyn-3-yl; 7-hydroxy-2,4,7,9-tetramethyl-5-decyn-4-yl; and 5-hydroxy-2,5-dimethyl-3-hexyn-2-yl.

Compounds falling within the scope of the formula in which Z does not contain a hydroxy group which have been found to be particularly advantageous are: 3,5-dimethyl-1-hexyn-3-yl; 1-hexyn-3-yl; 3-methyl-1-butyn-3-yl; and 3-methyl-1-pentyn-3-yl.

The foregoing compounds are usually effective in compositions containing 0.1 percent or less of active ingredient when such compositions are applied directly to areas infested with mites, spiders, ticks, and the like and are valuable in that they do not leave residues which are harmful or toxic to wildlife or human beings.

The terms "acaricide" or "acaricidal composition" as used herein is intended to mean and to include compounds and compositions which are effective in killing or controlling arachnids such as mites, spiders, ticks, etc.

In one of its aspects, the invention provides a composition comprising a carrier and an acaricidally effective quantity of a compound falling within the scope of the formula hereinbefore described. The carrier employed can be any carrier conventionally used in pesticidal formulations or compositions with the proviso that the carrier should be inert, that is, it should be incapable of undergoing a chemical reaction with the acaricidal compound. The carrier should also be one that will not be generally harmful to the environment other than the arachnid on which it is employed.

The carrier can be any one of a variety of organic and inorganic, liquid, solid, or semi-solid carriers or carrier formulations conventionally used in the pesticidal formulation art and can also be a mixture of such carriers. Examples of liquid carriers include liquid aliphatic hydrocarbon, for example, pentane, hexane, heptane, nonane, decane, and their analogs and homologs, as well as liquid aromatic hydrocarbon. Other liquid hydrocarbons which may be employed are those which are widely used for economic reasons and include oils produced by the distillation of coal and the distillation of various types and grades of petrochemical stocks. Petrochemical oils which are both useful and economical include kerosene oils, that is, oils composed of hydrocarbon mixtures of low molecular weight and which have from 10 to 16 carbon atoms. Such kerosene oils are obtained by fractional distillation of petroleum at between 360°F. and 510°F. and which usually have a flash point between 150°F. and 185°F. Other petroleum oils include those generally referred to in the art as "agricultural spray oils" which are light to medium oils consisting of the middle fraction obtained from the distillation of petroleum, have only slight volatility, and a viscosity in the range of from 40-85 seconds, Saybolt. Such oils are usually highly refined and contain only minute amounts of unsaturated compounds as measured by standard sulfonation tests. The customary sulfonation range of such oils is between 90 and 94 percent residue. These oils are often referred to as paraffin oils and can be emulsified with water and an emulsification agent from which the emulsion can be diluted to lower concentrations and used as sprays. Tall oils obtained from the sulfate digestion of wood pulp can also be employed alone or in conjunction with the aforedescribed paraffin oils.

In addition to the above-mentioned liquid hydrocarbons and often employed in conjunction therewith, the carrier can contain conventional emulsifying agents, for example, a nonionic surfactant, such as the ethylene oxide condensate of octyl phenol or an anionic surfactant, such as the alkali metal salt of an alkylbenzene sulfonic acid. The role of such emulsifiers is to permit the composition to be dispersed in and diluted with water for end use application.

When oils such as paraffin oils are employed as carriers in the acaricidal compositions of this invention, they are almost always used in conjunction with an emulsifier, the composition being diluted in water immediately prior to end use application. By way of example, when a compound falling within the scope of the above formula is dissolved in paraffin oil containing an emulsifier and the resultant composition is diluted with water to form an oil-water emulsion, the resulting liquid, when atomized and sprayed on arachnids and arachnid-infested areas, is highly effective against arachnids and their eggs which may be in the area.

Other advantageous organic liquid carriers which can be employed include liquid terpene hydrocarbons and terpene alcohols, for example, α-pinene, dipentene, terpineol, isoborneol, and the like.

Still other liquid carriers include organic solvents, such as aliphatic and aromatic alcohols, esters, aldehydes, and ketones. Aliphatic monohydric alcohols include methyl, ethyl, n-propyl, isopropyl, n-butyl, sec-butyl, t-butyl alcohols. Dihydric alcohols include glycols, such as ethylene and propylene glycol and the pentacols (i.e., alcohols having the empirical formula $C_6H_{12}(OH)_2$. Suitable polyhydroxy alcohols include glycerol, arabitol, erythritol, mannitol, sorbitol and the like. Suitable cyclic alcohols include cyclopentyl and cyclohexyl alcohols.

Conventional aromatic and aliphatic esters, aldehydes, and ketones may be used and are usually employed in combination with the above-mentioned alcohols. Still other liquid carriers, including high boiling petroleum products, such as mineral oil and higher alcohols (sometimes referred to as "liquid waxes") such as cetyl alcohol may also be employed.

Solid carriers which may be used in the acaricidal compositions of this invention include finely divided inorganic solids such as siliceous minerals, for example, clays, including bentonite, attapulgite, fuller's earth, diatomaceous earth, kaolin, talc, mica, finely divided quartz and synthetically prepared siliceous materials referred to as "siloxanes," for example, silica aerogels and precipitated and fumed silicas.

Examples of finely divided solid organic materials which are suitable for use as carriers in the acaricidal compositions of this invention include starch, flour, sugar, sawdust, casein, gelatin, and the like. When finely divided solid carriers are used, the acaricidal compositions are applied as dusts.

Examples of semi-solid carriers which can be employed include petroleum jelly, lanolin, and the like, and mixtures of liquid and solic carriers in proportions which result in semi-solid carrier products. The above-described carriers containing the acaricidal compounds can be employed per se or can be diluted with other suitable liquids or solids to exterminate arachnids such as mites, spiders, ticks, and the like. The compositions when used to contact an arachnid-infested area effectively kill the arachnids and their larva.

The amount of acaricidal compound which may be employed in the compositions of this invention may vary widely from about 0.1 to about 90 weight percent based on the weight of the composition in which the compounds are an intimate mixture with one or more of the above-mentioned carriers. The precise amount of compound employed will depend upon the intended end use.

When it is desired to employ the acaricidal composition directly, that is, without further dilution, the amount of acaricidal compound will usually vary between about 0.1 to about 0.5 weight percent. When it is desired to prepare a concentrated composition, that is, one suitable for dilution prior to end use, the acaricidal compound will usually be present in the composition at about 0.5 to about 90 weight percent. From a practical standpoint, compositions containing from about 0.5 to about 10 weight percent can be advantageously employed.

The compounds falling within the scope of the above formula have limited water solubility but are soluble in solvents conventionally used in the pesticidal art. However, compounds falling within the scope of the above formula can be readily made water soluble by converting them into the corresponding ammonium salts (or tertiary amine salts) by reacting them with an appropriate acid such as, for example, hydrochloride, hydrobromide, sulfuric, phosphoric acids, etc. to form the corresponding hydrochloride, hydrobromide acid sulphate, acid phosphate, and the like, salts. Such salts are readily soluble in water and can be applied to plants and soils infected with arachnids in the form of an aqueous solution as will be hereinafter evident from the specific examples. Such salts will readily kill mites, ticks, spiders, etc.

The following specific examples are intended to illustrate the invention but not to limit the scope thereof, parts and percentages being by weight unless otherwise specified.

EXAMPLE 1

Six separate dispersions containing 0.35 weight percent diethylaminoethyl monoether of 3,6-dimethyl-4-octyn-3,6-diol; the diethylaminoethyl monoether of 2,4,7,9-tetramethyl-5-decyn-4,7-diol; diethylaminoethyl monoether of 2,5-dimethyl-3-hexyn-2,5-diol; the diethylaminoethyl ether of 3,5-dimethyl-1-hexyn-3-ol; the diethylaminoethyl ether of 1-hexyn-3-ol; the diethyl-aminoethyl ether of 3,-methyl-1-butyn-3 -ol; 1 percent by weight of an emulsifying agent (specifically Triton, a trademark of Rohm & Haas Co. for an ethylene oxide condensate of ethylene oxide with octyl phenol), and 5 weight percent of acetone, the balance of the compositions consisting essentially of water, were prepared.

Seven separate groups of 20 lima bean seedlings, each group infested with a total of 100 spider mites were contacted with one of the above-described dispersions. Contact was effected by spraying 3 milliliters of the dispersion, using a conventional spraying device, into the air at a distance of 12 inches about the plant groups. Six groups were treated with one of the dispersions, the seventh serving as an untreated control. The amount of compound sprayed into the air was 10.5 milligrams in each instance. All groups of plants were examined for mites after 10 days. The mites killed in all of the six separate groups of seedlings ranged from 75 to 100 percent of the mites initially present. All of the mites in the untreated group of plants were alive.

When the corresponding propylaminoethyl ethers and the diethylaminopropyl ethers are employed in place of the corresponding diethylaminoethyl ethers of Example 1, more than 75 percent of

EXAMPLE 2

The procedure of Example 1 was repeated except that the dimethylaminoethyl ether of 3-methyl-1-pentyne-3-ol; the dimethylaminoethyl monoether of 3,6-dimethyl-4-octyne-3,6-diol; the dimethylaminoethyl monoether of 2,4,7,9-tetramethyl-5-decyne-4,7-diol; the dimethylaminoethyl ether of 2,5-dimethyl-3-hexyne-2,5-diol; the dimethylaminoethyl ether of 3,5-dimethyl-1-hexyne-3-ol; and the dimethylaminoethyl ether of 1-hexyne-3-ol were employed in place of the ethers employed in Example 1. Examination of the lima bean plants after 10 days resulted in a range of kill of between 80 and 100 percent of the mites in each group. All of the mites in the untreated controls were living.

EXAMPLE 3

The procedures of Examples 1 and 2 were repeated except that the hydrochloride derivatives of the compounds were employed in place of the compounds employed in Examples 1 and 2 and the dispersions were aqueous solutions instead of the aqueous acetone dispersions employed in those examples. In all instances, more than 80 percent of the mites were killed.

EXAMPLE 4

The procedure of Example 3 was repeated except that the acid sulphate salts of the compounds employed in Example 1 were used in place of those compounds. In all instances, results were substantially identical to those in Example 3.

What is claimed is:

1. A compound of the formula:

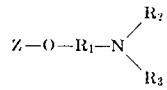

where Z is a hydroxy-substituted alkynyl group containing between five and 30 carbon atoms, $R_1$ is lower alkylene, and $R_2$ and $R_3$ are like or dissimilar lower alkyl.

2. The compound of claim 1 where $R_2$ and $R_3$ are like lower alkyl.

3. The compound of claim 2 where $R_2$ and $R_3$ are ethyl and $R_1$ is ethylene.

4. The compound of claim 3 where Z is 7-hydroxy-2,4,7,9-tetramethyl-5-decyn-4-yl.

5. The compound of claim 3 where Z is 6-hydroxy-3,6-dimethyl-4-octyn-3-yl.

6. The compound of claim 3 where Z is 5-hydroxy-2,5-dimethyl-3-hexyn-2-yl.

* * * * *